B. B. SMITH.
Cotton-Gins.
No. 156,183.  Patented Oct. 20, 1874.
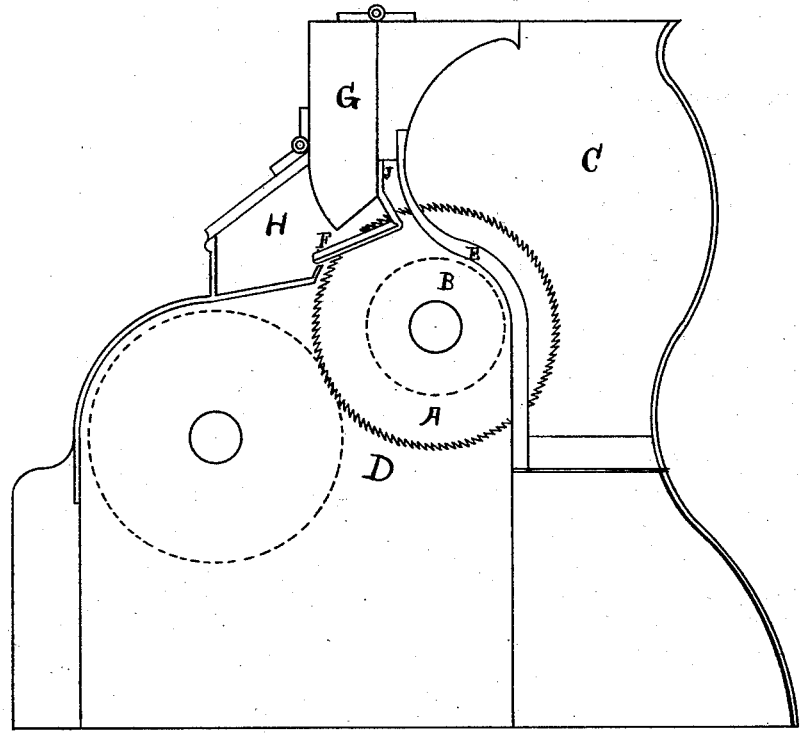
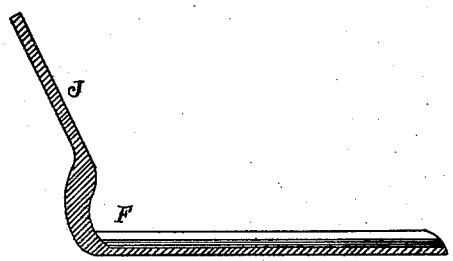
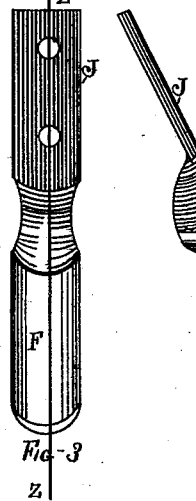
WITNESSES
W. H. Baskette
Robt. M. Fryer
Bennet B Smith
INVENTOR.

UNITED STATES PATENT OFFICE.

BENNET B. SMITH, OF NASHVILLE, TENNESSEE, ASSIGNOR OF ONE-HALF HIS RIGHT TO F. E. WHITFIELD, SR., OF CORINTH, MISSISSIPPI.

IMPROVEMENT IN COTTON-GINS.

Specification forming part of Letters Patent No. 156,183, dated October 20, 1874; application filed February 3, 1874.

*To all whom it may concern:*

Be it known that I, BENNET B. SMITH, of Nashville, in the county of Davidson and State of Tennessee, have invented a new and useful Improvement in Moting Apparatus for Cotton-Gins, of which the following is a specification:

The object of my invention is to provide a cheap and practical device for separating the motes from cotton while the same is being carried from the feeding-box of the gin (while the said cotton is undergoing the process of ginning) to that where it is taken from the saws by brushes or other expedient.

The nature of my invention consists chiefly in the construction of grooved metallic bars, so arranged between the saws, in rear of the grate-bars, that when said saws revolve the cotton is drawn through a contracted space between the grate-bars and the grooved moting-bars, whereby the motes, and all other similar particles in the cotton, are arrested and thrown off into a proper receptacle.

In order to make this more fully understood, and the novelty and usefulness of my invention apparent, I will proceed at once with the description, having reference to the accompanying drawings, in which—

Figure 1 represents a vertical section of an ordinary cotton-gin to which my moting device is attached; Fig. 2, a section of the said device through the line Z Z, Fig. 3. Fig. 3 is an outline view of the same from the front. Fig. 4 is an outline view of the same from the side.

A represents the toothed disks or saws of an ordinary cotton-gin, which are generally situated upon a mandrel, about one-half inch apart, being provided between the said saws with a wooden disk, B. (Shown in dotted lines in Fig. 1.) C is the box wherein the cotton is fed. D is another box or chamber, to which the cotton is carried by the said saws A, which pass through narrow passages formed between them and the grate-bars E, whereby the seeds and other coarse substances are taken from the cotton, the motes and other similar small particles of matter being carried on with the cotton.

Now, it will be seen that after this part of the operation in an ordinary cotton-gin, and before the motes and other small trash have followed the cotton as far as chamber D, I apply my device.

In Fig. 4 of my drawing is shown a side view of a grooved metallic bar, F, provided with shank J, which is shown from the end in Fig. 3. The groove or gutter herein represented serves the purpose of carrying off, by their own gravity, and the current of air present produced by the saws, the motes and other small trash which are extracted from the cotton by the sharp upper edges of the said bars F while the cotton is drawn between, as heretofore described.

G is a beam, represented in Fig. 1, extending all the way across the gin, and to which my moting-bars are attached at proper intervals, so as to bring one of each between each of the saws, as shown in the said Fig. 1.

I wish here to state that I am aware that many attempts have been made to procure a moting device, one of which was a revolving apparatus provided with bars, which could only present themselves between the saws at intervals; whereas my device is always present, and owing to its peculiar shape and adjustment, as shown in Fig. 1, it arrests the motes, and delivers them to box H, as shown, and should they become dull or too far removed from the saws to produce the desired effect the arches of the grooves can be flattened so as to spread them out wider, and then the edges be ground as sharp as desired. I therefore provide a cheap, practical, and substantial device, attachable to many gins now in use, whereby cotton can be more perfectly cleaned than by the usual process of ginning.

I do not claim any part of the cotton-gin herein described to which my device is attached; but What I do claim as my invention, and desire to secure by Letters Patent of the United States, is—

The grooved metallic moting-bar F J, in combination with a saw-gin, substantially as and for the purpose above set forth.

BENNET B. SMITH.

Witnesses:
W. H. BASKETTE,
ROBT. M. FRYER.